United States Patent

Hughes

[15] 3,706,935
[45] Dec. 19, 1972

[54] PULSE REPETITION FREQUENCY DETECTION AND LOCK-ON SYSTEM

[72] Inventor: Richard Smith Hughes, Code 4022 USNOTS, China Lake, Calif.

[22] Filed: July 11, 1966

[21] Appl. No.: 564,439

[52] U.S. Cl. ............... 328/155, 328/141, 307/218, 307/273, 307/291
[51] Int. Cl. ........................ H03b 3/04, H03k 5/18
[58] Field of Search......328/138, 139, 140, 141, 155; 329/107; 307/88.5, 218, 273, 291

Primary Examiner—Benjamin A. Borchelt
Assistant Examiner—R. Kinberg
Attorney—George J. Rubens, Roy Miller and Victor C. Muller

[57] ABSTRACT

A system for detecting the pulse repetition frequency of incoming pulse trains, determining when a particular pulse repetition frequency is present as a majority in a pulse train for a preset time and locking onto and continuously tracking the particular pulse repetition frequency.

1 Claim, 4 Drawing Figures

INVENTOR.
RICHARD S. HUGHES
BY
ROY MILLER
ATTORNEY 3,706,935

PULSE REPETITION FREQUENCY DETECTION AND LOCK-ON SYSTEM

The invention described herein may be manufactured and used by or for the Government of the United States of America for governmental purposes without the payment of any royalties thereon or therefor.

A system of this type should be applicable to accurately detect and efficiently lock-on pulse repetition frequencies over a wide range of frequencies in incoming pulse trains so that it is capable of use in interrogating such pulse trains with a minimum of degradation in performance. Also, the system should be capable of automatically resetting itself and automatically starting itself again for the detection and lock-on operations after periods of interruption or complete absence of incoming pulse trains.

Accordingly, it is a principal object of this invention to provide an accurate, efficient and automatic system for continuously interrogating all incoming pulse trains over a wide range of pulse repetition frequencies for the purpose of rapidly detecting the majority presence of a particular pulse repetition frequency and speedily locking onto the particular, detected pulse repetition frequency.

Additional objects of the invention will become apparent from the following description, which is given primarily for purposes of illustration, and not limitation.

Stated in general terms, the objects of the invention are attained by providing a detection and lock-on system which includes an AND gate that will pass pulses therethrough at a time only when they are of a predetermined pulse repetition frequency, as determined by a properly conditioned variable period one-shot circuit and a flip-flop circuit. When only pulses of the predetermined pulse repetition frequency are present in the input to the AND gate, as determined by a comparison of the period of the input pulses with that of two variable period one-shot circuits, the gate passes output pulses. The system locks on and tracks changes of frequency, but will automatically become unlocked by an error pulse if the frequency changes too rapidly.

A more detailed description of specific embodiments of the invention is given below with reference to the accompanying drawings, wherein.

Figure 1:
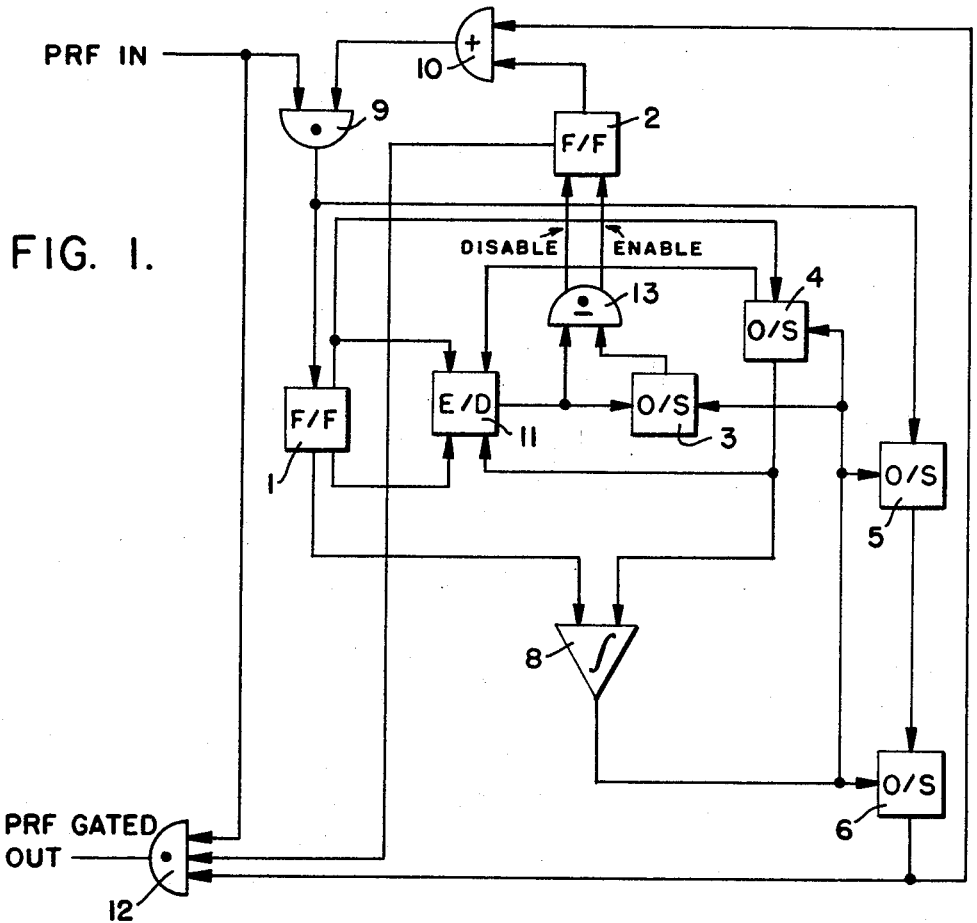
FIG. 1 is a schematic block diagram showing the general arrangement of the circuitry in a simplified embodiment of the pulse repetition frequency detection and lock-on system of the invention.

The system arrangement, in general, is illustrated in FIG. 1. An AND gate 12 receives incoming pulses and it passes these pulses if the one-shot 6 and the flip-flop 2 are properly conditioned. When only one PRF is present at the input, output pulses are passed by the AND gate 12 and the system is said to be PRF-gated. The system will track changes of frequency, once it is locked-on, but it will automatically become unlocked by the error pulse if the frequency changes too fast. Initially, the AND gate 9 is enabled by an output from the OR circuit 10, and input pulses are supplied to the flip-flop 1 and the one-shot 5. The output of flip-flop 1 triggers the one-shot 4, which has a variable period determined by the integrator 8 voltage. The flip-flop 1 and one-shot 4 operate an error-detect circuit 11, the output of which operates one-shot 3 and the not AND circuit 13. The one-shot 3 supplies an input to the not AND circuit 13. The output of the not AND circuit 13 operates the flip-flop 2, which supplies one of the control inputs to the AND circuit 12. The output of the integrator 8 is applied to the one-shots 5 and 6, and the one-shot 5 receives signals from the AND circuit 9. The one-shot 5 is similar to the one-shot 4, except that it has a shorter period for a given integrator voltage. The function of this one-shot is to trigger the one-shot 6, just prior to the expected next input pulse of a selected PRF signal. One-shot 5 is period controlled to keep a constant pre-enabled time, and it controls one-shot 6 for the same purpose. The output of the one-shot 6 is connected as the second control input to the AND circuit 12.

Figure 2:
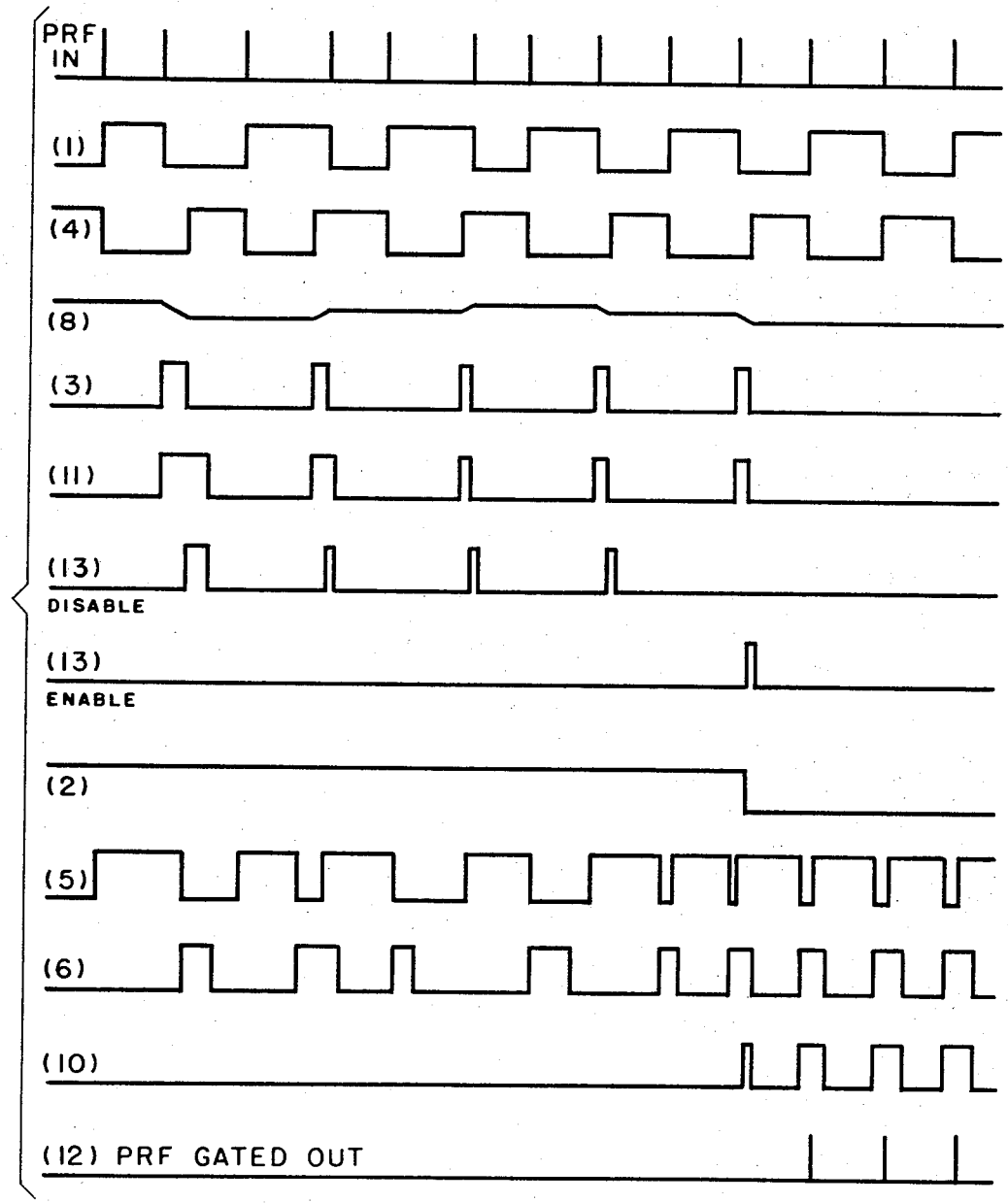
FIG. 2 is a voltage pulse diagram showing the waveforms of signals at various points in the system of FIG. 1.

Referring to the waveforms of FIG. 2, if the period of flip-flop 1, or the period between two input pulses, is less than the period of the one-shot 4, the resultant error from flip-flop 1 and one-shot 4 will be negative. The result will be a lower integrator voltage that narrows the period of one-shot 4, as shown in FIG. 2. The output of the error-detect 11 determines the state of flip-flop 2. The error that enables the system is controlled by the pulse width of one-shot 3. If little error can be tolerated, the pulse width of one-shot 3 will be small, and vice versa. If the error pulse is wider than the pulse width of one-shot 3, the disable output of not AND circuit 13 triggers the flip-flop 2 to off. When the error pulse width is shorter than the pulse width of one-shot 3, flip-flop 2 is enabled, which, in turn, allows one-shot 6 to enable AND gate 9.

As can be seen from FIG. 2, when only one pulse repetition frequency is present, outputs are obtained from AND gate 12, and the system itself becomes pulse repetition frequency-gated.

Figure 3:
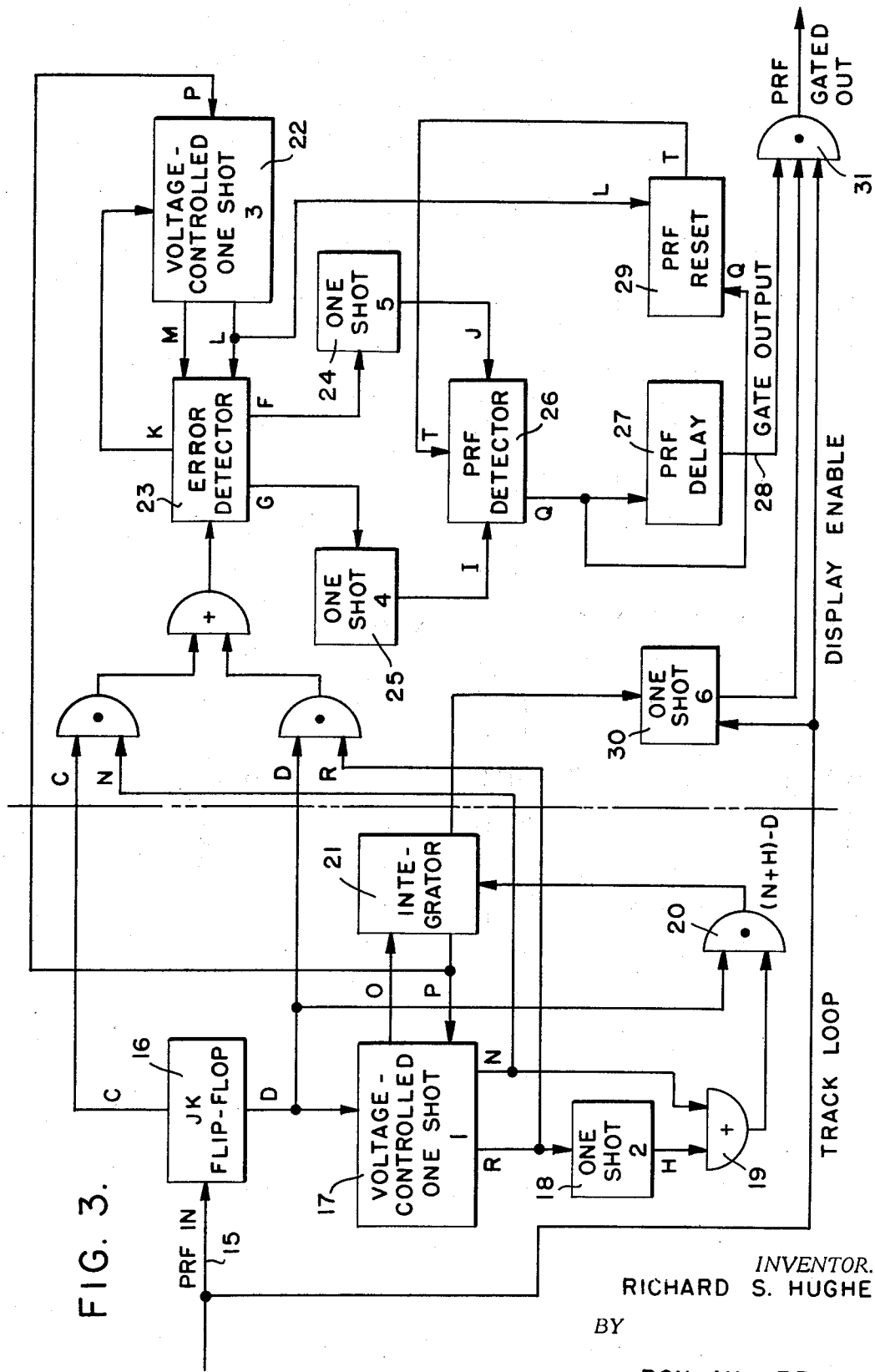
FIG. 3 is a schematic block diagram showing the particular arrangement of the circuitry in a specific embodiment of the pulse repetition frequency detection and lock-on system of the invention.

An actual embodiment of the system of the invention is shown in FIG. 3. The command signal 15 for the track-loop input is a variable frequency pulse train varying from 200 to 3,000 cps. A JK flip-flop 16 triggers off the leading edge of the PRF-signal, providing an output D at one-half the headtone PRF. The voltage-controlled one-shot 1 indicated at 17 triggers on the positive-going edge of the flip-flop 16 output with a duration directly proportional to the control voltage. The output R of the voltage-controlled one-shot 17 triggers one-shot 2, indicated at 18, at the trailing edge of the pulse to generate a $200\mu$ sec pulse H, which is OR-gated at 19 with the voltage-controlled one-shot 17 output N. The flip-flop 16 output D and the OR gate 19 output are applied to an AND gate 20, which drives the integrator 21 in an up (increasing voltage) direction. The voltage-controlled one-shot 17 output O is also applied to the integrator 21 to drive it in a down (decreasing voltage) direction. The effective track-loop error is the difference between the AND gate 20 output and the one-shot 17 output O. For the method employed, to obtain an error signal at the integrator 21, instantaneous loss of the signal causes the integrator to remain close to the value at signal loss for a period of time. Without benefit of one-shot 2 and the peripheral logic, an ON-OFF PRF could cause the integrator 21 to drive to an extreme position (depending on the state of the flip-flop 16 output) and would require excessive lock-on time when the PRF comes on again.

The integrator 21 output at P is fed back to one-shot 1 at 17 to complete the track loop. The value of the voltage at P ranges between 1.5 and 11 volts, depending on the PRF of the input signal 15 into the system. When the track loop is locked-on, the incoming signal 15, the control voltage at P is directly proportional to the period of the signal.

The control voltage from the track loop integrator 21 is applied to another voltage-controlled one-shot 3, indicated at 22, in the PRF display enable section of the PRF detector. The output of one-shot 3 and the outputs of the flip-flop 16 and one-shot 1 are processed in the error detector 23 to: (1) provide a trigger to one-shot 3 each time that a PRF signal appears on the input 15; (2) provide a trigger F to one-shot 5, indicated at 24, each time PRF lock-on is accomplished; and (3) provide a trigger G to one-shot 4, indicated at 25, only when an error appears at the PRF input 15.

The output signals F and G from error detector 23 trigger one-shot 5 and one-shot 4. The durations of these one-shots are equal, and are utilized in driving another integrator circuit in the PRF detector 26. The output J of one-shot 5 drives the integrator up and the output I of one-shot 4 drives it down. The good-to-bad pulse ratio (enable-to-disable ratio) is normally set for 1/2:1 so that a bad pulse drives the integrator one-half the amount of a good pulse. The PRF detector 26 contains a Schmitt trigger with an output appearing at Q, so that Q is up (logic one) during PRF lock-on, and down (logic zero) during PRF error conditions.

The output voltage Q of PRF detector 26 is delayed 100 msec in the PRF delay circuit 27 before a gate output 28 appears. That is, when a PRF input 15 is locked on by the detector, the Q voltage goes from ground to about 11 volts. The step is delayed 100 msec before the gate output 28 goes up. The delay time is adjustable from 15 to 150 msec in the event a delay time other than 100 msec is desired.

In the event the Q voltage remains up too long with complete loss of input PRF 15, a reset voltage from PRF reset 29 appears at T to force the PRF detector 26 down. When a signal is presented to the system, a pulse exists at L. The L signal keeps the reset capacitor of PRF reset 29 discharged under conditions of a signal input. If the signal disappears, the reset capacitor charges, causing the voltage at T to rise, and the PRF detector 26 is driven so that voltage Q drops to zero. The reset time is set to about 20 msec.

Figure 4:
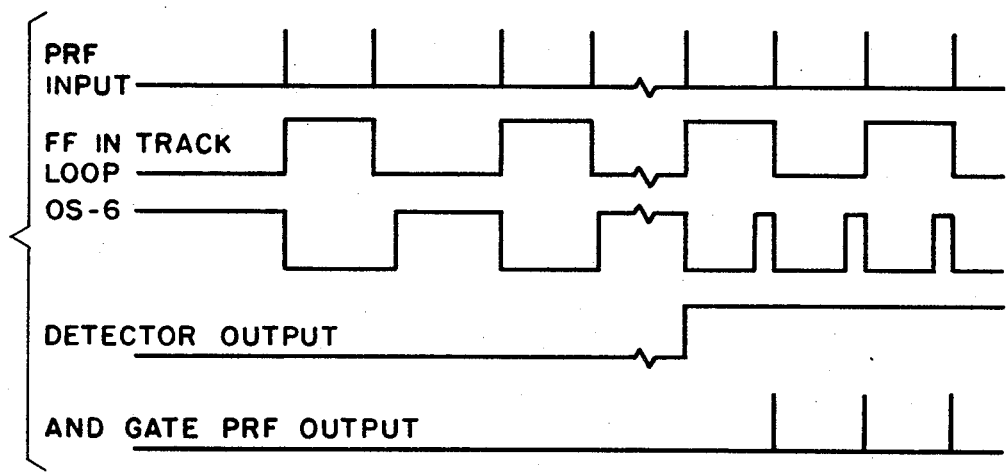
FIG. 4 is a voltage pulse diagram showing the waveforms of signals at various places in the system of FIG. 3.

With reference to FIGS. 3 and 4, the incoming PRF 15 is processed by the track loop, error detector 23 and PRF acquisition, as described above. One-shot 6, indicated at 30, the PRF-lock one-shot, has the same linear period as a function of control voltage as one-shot 1 and one-shot 3. One-shot 6 usually has a period that is equal to the period of one-shot 1 minus one-half the period of one-shot 3. The AND gate 31 is disabled by the output of the PRF detector 26 until a majority of one PRF is present. The output of the PRF detector 26 increases, thus enabling part of the AND gate 31. Now, one-shot 6 enables the AND gate 31 prior to the next expected PRF input and the system is locked on to a PRF, as desired.

Although the specific embodiment of the invention given above is designed to operate over a PRF range of 200 to 3,000 cps, where excellent results have been obtained, other operating ranges can be used by making slight modifications to the system, in accordance with the exercise of ordinary skill in the electronics art. Obviously, many other modifications and variations of the pulse repetition frequency detection and lock-on system of the present invention are possible in the light of the teachings given hereinabove. It is therefore to be understood that, within the scope of the appended claims, the invention can be practiced otherwise than as specifically described and illustrated hereinabove.

What is claimed is:

1. A pulse repetition frequency detection and lock on system which comprises:
   a. a track loop circuit which includes:
      1. a flip-flop circuit for receiving a train of incoming pulses which may have various pulse repetition frequencies;
      2. a variable period one-shot circuit coupled to the flip-flop circuit to be driven by a train of output pulses from the flip-flop circuit; and
      3. an integrator circuit coupled to the flip-flop and one-shot circuits for being driven in an increasing voltage direction by the output of the flip-flop circuit and in a decreasing voltage direction by the output of the one-shot circuit;
      4. the output of the integrator circuit being fed back to the one-shot circuit to complete the track loop, so that upon the track loop being locked on to the train of incoming pulses, the voltage of the integrator circuit output is a linear function of the period of the pulse repetition frequency of the train of incoming pulses;
   b. an error detector circuit coupled to the track loop for comparing the difference between the flip-flop circuit period and the one-shot circuit period, and for putting out enable and disable pulses logically;
   c. a pulse repetition frequency detector circuit coupled to the error detector circuit for processing the enable and disable output pulses from the error detector circuit and determining when a proper ratio of enable to disable pulses has been obtained;
   d. an AND gate coupled to the track loop, error detector and pulse repetition frequency detector circuits so that the AND gate is disabled by the output of the pulse repetition frequency detector circuit until a majority of one pulse repetition frequency is present in the train of incoming pulses so that the output of the pulse repetition frequency detector circuit increases and thus enables a part of the AND gate; and
   e. and a end-shot circuit coupled to the track loop circuit and the AND gate to enable the AND gate when a majority of one pulse repetition frequency is present in the train of incoming pulses so that the AND gate is enabled prior to the next expected pulse repetition frequency input in the train of incoming pulses and thus locks the system onto the desired pulse repetition frequency of the train of incoming pulses.

* * * * *